United States Patent
Laue et al.

(10) Patent No.: US 7,641,758 B2
(45) Date of Patent: Jan. 5, 2010

(54) METHOD FOR THERMAL SEAMING OF POLYIMIDES

(75) Inventors: Gregory Laue, Huntsville, AL (US);
William Clayton, Huntsville, AL (US);
Mark Johnson, Huntsville, AL (US);
Timothy Wright, Huntsville, AL (US);
Kevin Melton, Huntsville, AL (US);
Garrett Poe, Madison, AL (US)

(73) Assignee: NeXolve Corp., Huntsville, AL (US)

( * ) Notice: Subject to any disclaimer, the term of this patent is extended or adjusted under 35 U.S.C. 154(b) by 321 days.

(21) Appl. No.: 11/740,267

(22) Filed: Apr. 25, 2007

(65) Prior Publication Data

US 2008/0264561 A1 Oct. 30, 2008

(51) Int. Cl.
*G03G 15/01* (2006.01)
(52) U.S. Cl. .................................. 156/308.4
(58) Field of Classification Search .............. 156/308.4
See application file for complete search history.

(56) References Cited

U.S. PATENT DOCUMENTS

| | | | |
|---|---|---|---|
| 4,321,299 A * | 3/1982 | Frosch et al. ............... | 442/379 |
| 6,017,002 A | 1/2000 | Burke | |
| 6,119,986 A | 9/2000 | Stribling | |
| 6,328,922 B1 * | 12/2001 | Mishra et al. ............... | 264/322 |
| 6,623,826 B2 | 9/2003 | Hasegawa | |
| 7,139,519 B2 * | 11/2006 | Darcy et al. ................. | 399/302 |
| 2004/0142176 A1 | 7/2004 | Wang | |

FOREIGN PATENT DOCUMENTS

| | | |
|---|---|---|
| GB | 9317836 | 3/1994 |
| JP | 10016057 A * | 1/1998 |

* cited by examiner

*Primary Examiner*—Jeff H Aftergut
*Assistant Examiner*—Jaeyun Lee
(74) *Attorney, Agent, or Firm*—David E. Mixon; Mark Swanson; Bradley Arant Boult Cumming

(57) ABSTRACT

The present invention is a method for seaming a polyimide material. The method involves forming an interface between multiple the polyimide materials. Next, heat is applied to the interface to soften the polyimide material. The temperature of the heat source is below the melting point of the polyimide material. Finally, pressure is applied to the interface to create a seam between the polyimide materials.

3 Claims, 2 Drawing Sheets

METHOD FOR THERMAL SEAMING OF POLYIMIDES

BACKGROUND OF INVENTION

1. Field of the Invention

The invention related generally to the manufacture of thin film polyimides. More specifically, the invention relates to a method of thermal seaming sheets of a polyimide material.

2. Background Art

Thin film polyimides are commonly used on satellites and other space flight equipment. They are typically thin polymer films with an applied reflective metallized evaporative coating. These films are used as solar shields, solar concentrators, solar sails, etc. A reflective membrane may be used to protect orbital structures and equipment such as satellites from direct exposure to solar radiant flux. Alternatively, a reflective membrane may be used to concentrate solar energy on equipment such as a solar panel that powers a satellite.

Sheets of film are often seamed together to make a larger thin film sheet. However, the films are usually 2 mils thick or less and the material used is sensitive to mechanical tears and contamination. Welding had not traditionally been used because polyimides and other similar polymeric materials do not possess a definite established melting point. The materials also decompose rapidly if heated to their melting point which makes conventional welding techniques impractical.

Prior art techniques of seaming include bonding the materials with am adhesive or alternatively employing a mechanical fastener. However, adhesive seaming is messy and prone to contamination. Additionally, adhesives such as acrylic or silicon lose mechanical strength at low temperatures. A mechanical fastener, such as stitching with thread, is prone to tearing especially if single layers of materials are seamed together. Consequently, a method for effectively seaming thin film polyimides is needed.

SUMMARY OF INVENTION

In some aspects, the invention related to a method for seaming a polyimide material, comprising; forming an interface between a plurality of bodies comprising the polyimide material; applying heat to the interface to soften the polyimide material, where the heat is below the melting point of the polyimide material; and applying pressure to the interface.

In other aspects, the invention relates to a method for seaming a polyimide material, comprising: step for forming an interface between a plurality of bodies of polyimide material; and step for applying hear and pressure to the interface to form a diffusion weld.

In other aspects, the invention relates to a method for seaming a polyimide material to a second material, comprising; forming an interface between the polyimide material and the second material, where the heat is below the melting point of the polyimide material and the second material; and applying pressure to the interface.

In other aspects, the invention relates to a method for seaming a polyimide material to a second different material, comprising; step for forming an interface between the polyimide material and the second different material; and step for applying heat and pressure to the interface to form a diffusion weld.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

A method for thermally seaming thin film polyimides has been developed. Examples of thin film polyimides include pyromellitic dianhydride/oxydianiline PMDA/ODA) (Kapton®, 2,2'-bis-(3,4-dicarboxyphenyl) hexafluoropropane dianhydride/2,2'-bis-[4(4-aminophenoxy)phenyl]hexafluoropropane (6FDA/4BDAF) (CP1), and other similar polymeric materials. The method includes the application of heat and pressure to thermally fuse two layers of material together. The method produces a weld called a "diffusion weld" that is acceptably strong and effective under a wide range of temperature conditions. The method is effective in seaming ultra thin polymer materials that may have a thickness of less than 5 microns.

"Diffusion welding" involves joining polyimides by applying heat and pressure for a defined period of time. This results in a plastic flow of material at the interface between the two bodies of materials. The plastic flow removes, agglomerates, or buries surface contaminants while bringing the bodies into intimate contact by flattening surface asperites. The molecules of the material are diffused and repositioned across the interface of the bodies until the interface becomes indistinct and energy is required to separate the bodies.

In order for diffusion welding to occur, the edges of the sheet of polyimide to be seamed (called a "faying surface") must be heated a suitable bonding temperature. Polyimides have a distinct glass transition temperature ($T_g$) where the material softens and distorts. The suitable bonding temperature for diffusion welding is slightly higher than $T_g$. Once heated, pressure is added to the faying surface in order to promote diffusion of the softened material across the interface of the bodies.

Figure 1:
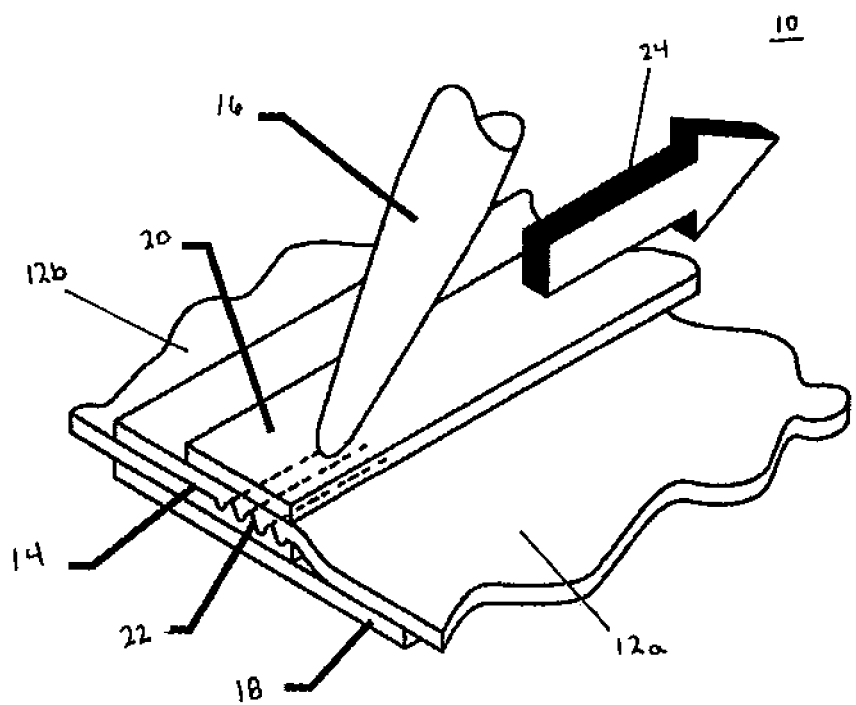
FIG. 1 shows a thermal seaming method that utilizes a heated stylus in accordance with one embodiment of the present invention.
Figure 2:
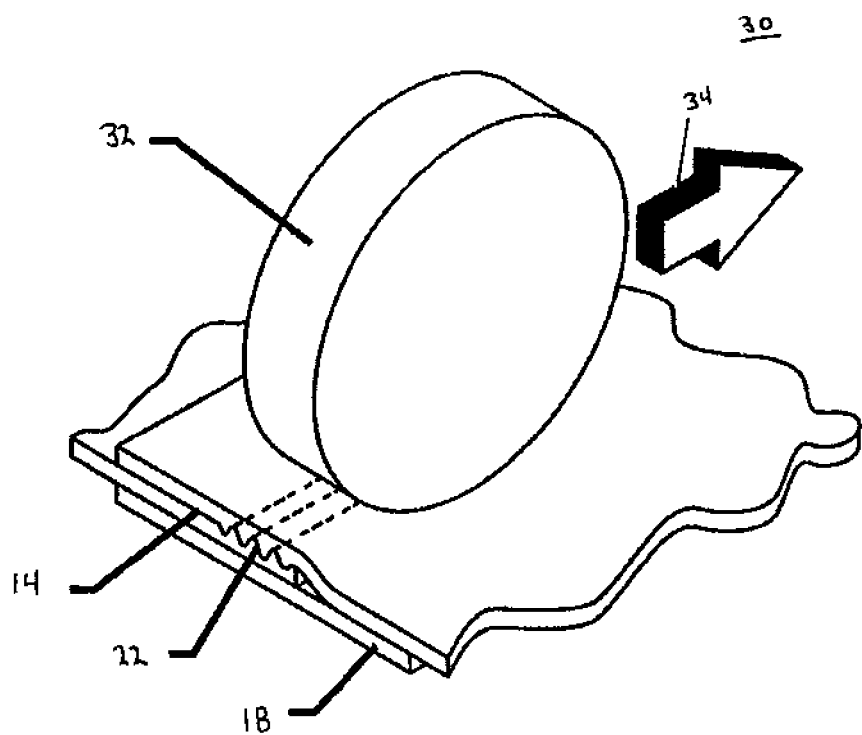
FIG. 2 shows a thermal seaming method that utilizes a heated roller in accordance with one embodiment of the present invention.
Figure 3A:
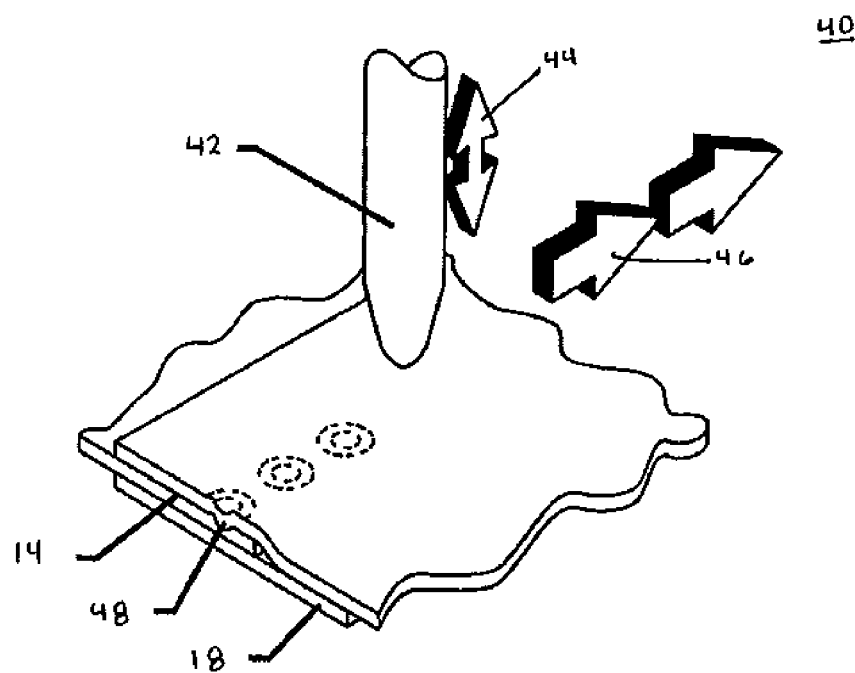
FIGS. 3a and 3b shows a thermal seaming method that utilizes a heated plunger in accordance with one embodiment of the present invention.

In one embodiment of the present invention, the polyimide materials are heated by contact with a heating tool that also applied pressure to the faying surfaces. FIG. 1 shows an example of a thermal seaming system 10 that uses a heated stylus 16. Two sheets of a polyimide material 12a and 12b are positioned with their respective faying surfaces forming an overlapping interface 14. The interface 13 is placed on an insulative backing 18 and a protectice overlay 20 is placed over the top of the interface 14. A heated stylus 16 is then dragged 24 across the overlay 20. The stylus 16 applies both heat and pressure to the interface 14 and forms a diffusion weld 22. FIG. 2 shows an alternative embodiment 30 of the present invention that utilizes a heated wheel 32. In this embodiment, a heated wheel 32 is rolled 34 across the interface 14 to apply both heat and pressure that forms a diffusion weld 22. While this embodiment is shown without a protective overlay, it should be understood that one could be used in other embodiments that use a heated wheel. FIG. 3a shows another embodiment 40 of the present invention that utilizes a heated plunger 42. In this embodiment, the heated plunger moves intermittently in vertical 44 and horizontal 46 directions applying heat and pressure at various points along the interface 14. The effect is to create multiple "spot" diffusion welds 48.

Figure 3B:
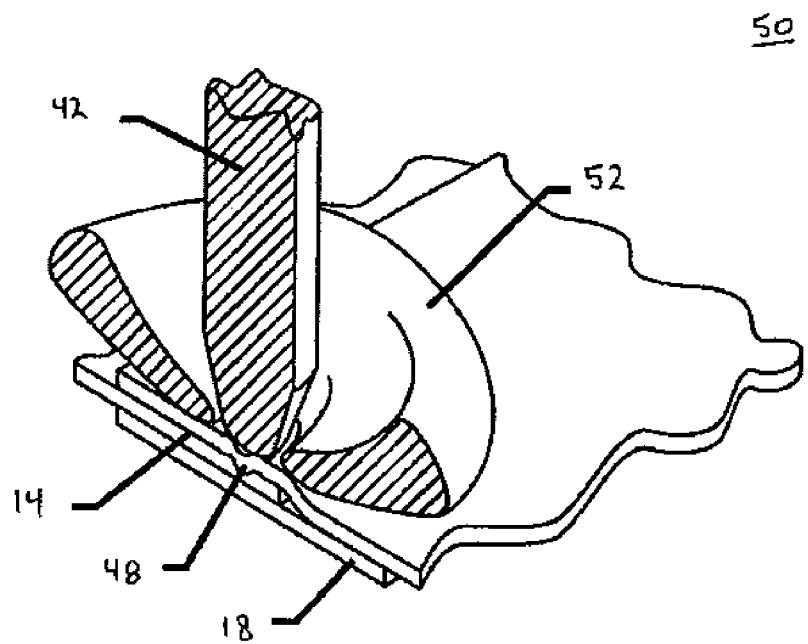

Most welds of materials with a non-zero coefficient of thermal expansion have differential shrinkage distortion of the joined bodies upon cooling. This is the result of temperature gradients which are characteristic in practically all welding techniques. In seaming thin film membranes for applications such as solar sails, this distortion is undesirable. It can be reduced by locally tensioning the membrane bodies in the vicinity of the weld during the welding process. When the tension is released, the local residual compression stress tends to counteract the local residual tensile stresses that result form the weld. FIG. 3b shows one embodiment of the present invention 50 that utilizes a heated plunger 42 in conjunction with a local tensioner 52. In this embodiment, the tensioner 52 is circular-shaped. The plunger 42 contacts the interface 14 through the opening in the tensioner 52 to create the diffusion weld 48.

The examples shown in FIGS. 1-3b demonstrate diffusion welding of shear or overlapping joints. Other embodiments of the present invention could be used to produce butt or tensile joints. In these embodiments, the faying surfaces are abutted rather than overlapped. The heated bonding tool is brought in contact with the abutting interface, which results in a thickness reduction and a lateral flow across the interface to form a diffusion weld.

While the present invention has been described as for seaming two similar polyimide materials, the methods disclosed can also be used to seam two dissimilar materials. For example, the various embodiments could be used to seam a polyimide with a different polyimide material such as seaming Kapton®and CP1 together. Other embodiments may involve seaming a polyimide to any of the following: polyamides (Nylon); polyesters (PEN or PET/Mylar); polyamide imide (PAI/Torlon); polyether keytone (PEK); polyether ketone ketone (PEKK); polyether ether keytone (PEEK); polyether imide (PEI); polyphenylene sulfide (PPS); polyether sulfone (PES); and poluphenylene (Parmax). These materials are given as examples of alternative materials that may be used in combination with polyimides. It should be understood that other materials know in the art with the similar performance characteristics could be used as well.

While these embodiments show a single device that provides both heat and pressure to the interface, it should be understood that alternative embodiments could use multiple devices to provide these as desired. Further, the temperatures and pressured applied will depend on the specific characteristics of each material. However, it is common for the suitable bonding temperature to exceed 500° F. yet still now reach the melting point of the material. If two dissimilar materials, such as a polyimide and non-polyimide, are being bonded then the non-polyimide should be heated to a lesser temperature than the polyimide. One way this may be accomplished is by placing a heat source directly on the polyimide while placing the non-polyimide underneath the polyimide to avoid direct contact with the heat source.

One advantage of the present invention is that a seam created by the disclosed invention exhibits decreased tear propagation at the seam points. Another advantage is that the present invention eliminates the need for adhesives to join the two materials. This prevents thermal deformations due to inherent differences in the CTE (co-efficient of thermal expansion) of the materials and the adhesive. This can be a problem at lower temperatures when the modulus of the adhesive tends to increase. Another advantage is that characteristic conductivity of conductive materials such as carbon-filled Kapton is retained at the seaming point.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method for seaming a polyimide material to a second material, comprising:
   forming an interface between the polyimide material and the second material, where the second material is different than the polyimide material;
   applying heat to the interface to soften the polyimide material and the second material, where the heat is above the glass transition temperature of the polyimide material and the second material;
   applying pressure to the interface such that molecules of the polyimide material and the second material diffuse across the interface; and
   applying a reflective coating to at least one of the polyimide material and the second material.

2. The method of claim 1, where the second material comprises a different polyimide material.

3. The method of claim 1, where the second material comprises a polyamide imide.

\* \* \* \* \*